(12) United States Patent
Hashmonay et al.

(10) Patent No.: US 11,009,399 B2
(45) Date of Patent: May 18, 2021

(54) METHODS FOR CLASSIFICATION OF A GAS COMPOUND IN A GAS LEAK

(71) Applicant: OPGAL Optronic Industries Ltd., Karmiel (IL)

(72) Inventors: Ram Hashmonay, Karmiel (IL); Omer Yanai, Karmiel (IL)

(73) Assignee: OPGAL Optronic Industries Ltd., Karmiel (IL)

( * ) Notice: Subject to any disclaimer, the term of this patent is extended or adjusted under 35 U.S.C. 154(b) by 0 days.

(21) Appl. No.: 16/635,230

(22) PCT Filed: Jun. 20, 2019

(86) PCT No.: PCT/IL2019/050699
§ 371 (c)(1),
(2) Date: Jan. 30, 2020

(87) PCT Pub. No.: WO2019/244162
PCT Pub. Date: Dec. 26, 2019

(65) Prior Publication Data
US 2021/0102840 A1 Apr. 8, 2021

Related U.S. Application Data

(60) Provisional application No. 62/687,834, filed on Jun. 21, 2018.

(51) Int. Cl.
*G01N 21/00* (2006.01)
*G01J 3/28* (2006.01)
(Continued)

(52) U.S. Cl.
CPC .......... *G01J 3/2823* (2013.01); *G01M 3/002* (2013.01); *G01M 3/38* (2013.01); *G01N 21/3504* (2013.01);
(Continued)

(58) Field of Classification Search
CPC ...... G01J 3/42; G01N 2021/399; G01N 21/39; G01N 21/3504; G01N 21/031
(Continued)

(56) References Cited

U.S. PATENT DOCUMENTS 4,489,239 A 12/1984 Grant et al.
4,914,719 A 4/1990 Conlon et al.
(Continued)

FOREIGN PATENT DOCUMENTS

| CN | 106769948 | 5/2017 |
| WO | WO 2017/201194 | 11/2017 |
| WO | WO 2018/087768 | 5/2018 |

OTHER PUBLICATIONS

International Search Report of PCT Application No. PCT/IL2019/050699, dated Oct. 31, 2019.
(Continued)

*Primary Examiner* — Md M Rahman
(74) *Attorney, Agent, or Firm* — Pearl Cohen Zedek Latzer Baratz LLP

(57) ABSTRACT

A method and a system for classifying at least one individual gas compound from a plurality of leaked gases in a specified field of view are provided herein. The method may include the following steps: generating, by a cryogenically cooled detector and using a first of at least n filters, multiple spectral band images of the specified view in spectral bands coinciding with said leaking gases spectral bands in which said leaking gases emit and absorb electromagnetic radiation; calculating from the images, the relative absorption response of said gases in each of said filters, respectively; calculating a set of predetermined coefficients; normalizing said relative absorption responses to the sum of relative responses of said filters; and calculating the weighted average molecular mass of said gas compound of said leaking gases.

7 Claims, 10 Drawing Sheets

(51) Int. Cl.
  *G01N 21/3504* (2014.01)
  *G01M 3/38* (2006.01)
  *G01M 3/00* (2006.01)

(52) U.S. Cl.
  CPC ................ *G01J 2003/2826* (2013.01); *G01N 2021/3531* (2013.01)

(58) Field of Classification Search
  USPC ........................................................ 356/437
  See application file for complete search history.

(56) References Cited

U.S. PATENT DOCUMENTS

| | | |
|---|---|---|
| 5,306,913 A | 4/1994 | Noack et al. |
| 5,900,635 A | 5/1999 | Weckstrom |
| 2009/0213380 A1 | 8/2009 | Appel et al. |
| 2010/0284570 A1 | 11/2010 | Grimberg |
| 2011/0199605 A1 | 8/2011 | Yaacobi |
| 2014/0361173 A1 | 12/2014 | Kuester et al. |
| 2017/0097301 A1 | 4/2017 | Lefebvre et al. |
| 2018/0136072 A1 | 5/2018 | Cabib |

OTHER PUBLICATIONS

Office Action for Chinese Patent Application No. 2019800039483, dated Jan. 4, 2021.
Extended European Search Report for EP Patent Application No. 19822606.0, dated Feb. 23, 2021.

METHODS FOR CLASSIFICATION OF A GAS COMPOUND IN A GAS LEAK

CROSS-REFERENCE TO RELATED APPLICATIONS

This application is a National Phase Application of PCT International Application No. PCT/IL2019/050699, International Filing Date Jun. 20, 2019, entitled: "METHODS FOR CLASSIFICATION OF A GAS COMPOUND IN A GAS LEAK", published on Dec. 26, 2019, under publication No. WO 2019/244162, which claims the benefit of U.S. Provisional Patent Application No. 62/687,834, filed on Jun. 21, 2018, which is hereby incorporated by reference in its entirety.

FIELD OF THE INVENTION

The present invention relates to the field of gas leak detection, and more particularly, to methods for classifying individual gas compounds and/or a group of gas compounds from the gas leak.

BACKGROUND OF THE INVENTION

Oil, gas, chemical and power plant industries are constantly seeking for efficient in-situ detection of fugitive gas leakages. Most of the gases used (e.g., methane, propane, benzene, etc.) in these industries are highly toxic and explosive when mixed with air. Moreover, most of the leaking gases belong to the category of greenhouse gases and therefore are contributing to climate instability and temperature increase. Furthermore, the gas leakage problem is causing profit-losses to the industries thereof.

Typically, regulations in most of the developed countries require constant monitoring of equipment in order to control and reduce to a minimum gas leakage. Currently, there are many different products that facilitate detection of volatile organic compounds (VOC) and other gases. Most of these products belong to a category named "sniffers". Sniffers provide accurate gas concentration readings but suffer from extensive labor related to the inspection process that has to be performed locally in close proximity to pipes, valves or any other gas carrying components.

Optical gas imaging systems are also known for gas leak detection. Different gases are characterized by different absorption lines in different spectral bands, which may enable detecting and classifying different gases or group of gases using different filters. Typically, optical gas detection systems include cooled detector and cooled or non-cooled band-pass filter(s), e.g., both located in a camera's dewar. The sensitivity of such systems is limited to a gas of a single type (or limited types of gases), due to, for example, disability of replacing the cooled or non-cooled band-pass filter(s) with different filters adapted for different types of gases.

Current Optical Gas Imaging (OGI) technology can visualize leaks of volatile organic compounds (VOCs) in petrochemical industry facilities. Typically, these plumes of emitted gases are comprised of a mixture of various alkane compounds and aromatics. Current OGI technology utilizes a highly sensitivity, cryogenically cooled camera, which is tuned to detect hydrocarbon gases by using a spectral bandpass filter between 3.2 µm and 3.4 µm where these gases have absorption lines.

Due to the harmful nature of some compound (e.g. Benzene, which was proven to be a carcinogen) it is important for the regulators and industry to not only detect gas leaks, but also know whether it is a gas plume with high content of benzene or a plume of mostly alkane mixture (e.g. propane, butane and such) which are much less harmful. In addition, methane is a very potent greenhouse gas (GHG) and therefore in many occasions it is important to determine whether the detected gas plume has a high content of methane. In additional embodiments of the present invention the OGI technology may apportion sulfur dioxide, carbon dioxide, and carbon monoxide in stack and flare's emission plumes.

SUMMARY OF THE INVENTION

One aspect of the present invention provides a method of classifying at least one individual gas compound from a plurality of leaked gases in a specified field of view, the method comprising: generating, by a cryogenically cooled detector and using a first of at least n filters, a first spectral band image of the specified view in a first spectral band coinciding with said leaking gases spectral bands in which said leaking gases emit and absorb electromagnetic radiation; generating, by said cryogenically cooled detector and using a second of said at least n filters, a second spectral band image of the specified view in a second spectral band coinciding with said leaking gases spectral band in which said leaking gases emit and absorb electromagnetic radiation; calculating from the first and second images the relative absorption response of said gases in each of said first and second filters, respectively; calculating a set of predetermined coefficients, wherein a first coefficient is the integrated spectral absorption response of a first gas compound and transmission of said first filter, relative to a predetermined known concentration of a known gas; a second coefficient is the integrated spectral absorption response of a second gas compound and transmission of said first filter, relative to said predetermined known concentration of a known gas; a third coefficient is the spectral absorption response of a first gas compound and said transmission of said second filter, relative to said predetermined known concentration of a known gas; and a fourth coefficient is the spectral absorption response of a second gas compound on and said transmission of said second filter, relative to said predetermined known concentration of a known gas; normalizing said relative absorption responses to the sum of relative responses of said first and second filters respectively; and calculating the weighted average molecular mass of said gas compound or group of gas compounds of said leaking gases by determining the pure relative responses on said first and second filters and comparing each response to the observed relative response on said first and second filters.

Another aspect of the present invention provides a method for classifying at least a group of gas compounds from a plurality of leaked gases in a specified field of view, the method comprising: generating, by a cryogenically cooled detector and using a first of at least n filters, a first spectral band image of the specified view in a first spectral band coinciding with said leaking gases spectral bands in which said leaking gases emit and absorb electromagnetic radiation; generating, by said cryogenically cooled detector and using a second of said at least n filters, a second spectral band image of the specified view in a second spectral band coinciding with said leaking gases spectral band in which said leaking gases emit and absorb electromagnetic radiation; calculating from the first and second images, the relative absorption response of said gases in each of said first and second filters, respectively; calculating a set of predetermined coefficients, wherein a first coefficient is the integrated spectral absorption response of a first gas and transmission of said first filter, relative to a predetermined known concentration of a known gas; a second coefficient is the integrated spectral absorption response of a second gas and transmission of said first filter, relative to said predetermined known concentration of a known gas; a third coefficient is the spectral absorption response of a first gas and said transmission of said second filter, relative to said predetermined known concentration of a known gas; and a fourth coefficient is the spectral absorption response of a second gas on and said transmission of said second filter, relative to said predetermined known concentration of a known gas; normalizing said relative absorption responses to the sum of relative responses of said first and second filters respectively; and calculating the weighted average molecular mass of said gas or group of gases of said leaking gases by determining the pure relative responses on said first and second filters and comparing each response to the observed relative response on said first and second filters.

A method for classifying at least one individual gas compound and a group of gas compounds from a plurality of leaked gases in a specified field of view, the method comprising: generating, by a cryogenically cooled detector and using a first of at least n filters, a first spectral band image of the specified view in a first spectral band coinciding with said leaking gases spectral bands in which said leaking gases emit and absorb electromagnetic radiation; generating, by said cryogenically cooled detector and using a second of said at least n filters, a second spectral band image of the specified view in a second spectral band coinciding with said leaking gases spectral band in which said leaking gases emit and absorb electromagnetic radiation; generating, by said cryogenically cooled detector and using a third of said at least n filters, a third spectral band image of the specified view in a third spectral band coinciding with said leaking gases spectral band in which said leaking gases emit and absorb electromagnetic radiation; calculating from the first, second and third images the relative absorption response of said gas compounds in each of said first, second and third filters, respectively; calculating a set of predetermined coefficients, wherein a first coefficient is the integrated spectral absorption response of a first gas and transmission of said first filter, relative to a predetermined known concentration of a known gas; a second coefficient is the integrated spectral absorption response of a second gas and transmission of said first filter, relative to said predetermined known concentration of a known gas; a third coefficient is the spectral absorption response of a third gas and said transmission of said first filter, relative to said predetermined known concentration of a known gas; and a fourth coefficient is the spectral absorption response of a first gas on and said transmission of said second filter, relative to said predetermined known concentration of a known gas, wherein a fifth coefficient is the integrated spectral absorption response of said second gas compound and transmission of said second filter, relative to a predetermined known concentration of a known gas; a sixth coefficient is the integrated spectral absorption response of said third gas and transmission of said second filter, relative to said predetermined known concentration of a known gas; a seventh coefficient is the spectral absorption response of said first gas compound and said transmission of said third filter, relative to said predetermined known concentration of a known gas; an eighth coefficient is the spectral absorption response of said second gas compound on and said transmission of said third filter, relative to said predetermined known concentration of a known gas, a ninth coefficient is the spectral absorption response of said third gas compound on said transmission on said third filter, relative to said predetermined known concentration of a known gas; normalizing said relative absorption responses to the sum of relative responses of said first, second and third filters respectively, and calculating the weighted average molecular mass of said gas compounds or group of gas compounds of said leaking gases by determining the pure relative responses on said first, second and third filters and comparing each response to the observed relative response on said first, second and third filters.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
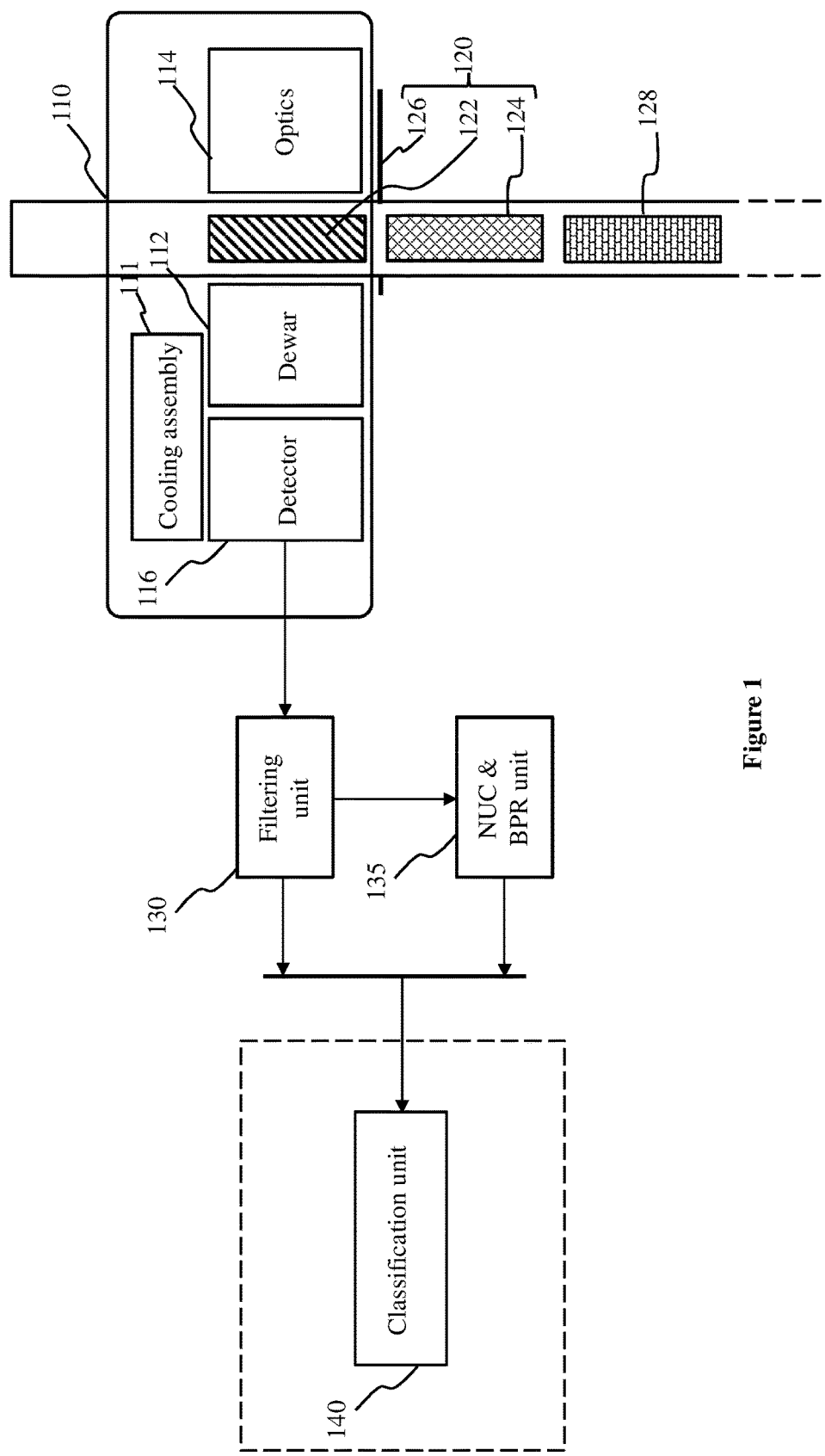
FIG. 1 is a schematic illustration of a system for classifying an individual gas compound and/or a group of compounds (for example, alkanes or aromatics or benzene) from a gas leak and/or for an automatic detection of the gas leak in a specified field of view, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, system and method of classifying a group of gases within a gas leak in a specified field of view are disclosed. The system may comprise a cooled detector and optics, and at least two interchangeable band-pass filters located between the optics and the detector. A first band-pass filter transmits electromagnetic radiation in a first spectral band that coincides with a first class of leaking gas spectral band. A second band-pass filter transmits only electromagnetic radiation in a second spectral band that coincides with a second class of leaking gas spectral band. The system may comprise a classification unit arranged to process the images generated by the cooled detector to thereby determine, based on the images thereof, a flowrate of the leaking gas in the specified field of view. Further, the system may comprise a detection unit arranged to determine, based on alternately generated multiple first spectral band images and multiple second spectral band images, a gas leak in the specified field of view.

Reference is now made to FIG. 1, which is a schematic illustration of a system for classifying an individual gas compound or a group of gas compounds from a gas leak and/or for an automatic detection of the gas leak in a specified field of view, according to some embodiments of the invention.

System 100 may comprise an imaging unit 110 (e.g., infrared (IR) video or stills camera) comprising optics 114 in association with a detector 116. Optics 114 may be arranged to focus electromagnetic radiation onto detector 116 and/or to ensure a desired optical path of the electromagnetic radiation thereof. In some embodiments, detector 116 is a cryogenically cooled thermal detector (e.g., cryogenically cooled by a cooling assembly 111). Detector 116 may be arranged to operate (e.g., to detect electromagnetic radiation) within a specified spectral range. In various embodiments, detector 116 is arranged to operate within a mid-wave infrared (IR) range (e.g., to detect electromagnetic radiation ranging within 3-5 μm wavelength) and/or to operate within a longwave IR range (e.g., to detect electromagnetic radiation ranging within 7-14 μm wavelength). Detector 116 may be arranged to generate, based on the detected electromagnetic radiation, at least one image of the specified field of view. In some embodiments, the specified field of view comprises an individual gas compound or a group of gas compounds of leaking gas.

In some embodiments, the specified spectral band of detector 116 is determined based on a type of the leaking gas. For example, the specified spectral band may be set to range between 3-5 μm wavelength for classifying leaking gases such as acetylene, ethane, heptane, hydrogen chloride, isobutane, isooctane, isopentane, octane and/or methane. It is noted that the specified spectral band of detector 116 may be set to different values based on, for example, the type of the leaking gas compound or group of gas compounds.

System 100 may comprise a filters assembly 120. Filters assembly 120 may comprise a first band-pass filter 122. First band-pass filter 122 may be a non-cooled filter (e.g., filter that is not subjected to any thermal stabilization means) or it may be a cooled filter (e.g. a filter that is subjected to cooling means). First band-pass filter 122 may be arranged to transmit electromagnetic radiation ranging within a first spectral band. The first spectral band may be determined based on the type of the leaking gas. In some embodiments, the first spectral band is set to coincide with a non-transparent leaking gas spectral band in which the leaking gas emits and absorbs electromagnetic radiation.

For example, if the leaking gas is methane, the first spectral band may be set to range between 3.2-3.5 μm (3.2 to 3.5 μm base to base, i.e. minimum wavelength $\lambda_{min}$ to $\lambda_{max}$) in which methane emits and absorbs electromagnetic radiation. In various embodiments, the leaking gas has several spectral bands in which it emits or absorbs electromagnetic radiation, and/or the first spectral band is set to coincide with the optimal leaking gas spectral band.

Filters assembly 120 may comprise a second band-pass filter 124. Second band-pass filter 122 may be a cooled filter or it may be an uncooled filter (e.g., filter that is not subjected to any temperature stabilization means or subjected to temperature stabilization means). Second band-pass filter 124 may be arranged to transmit electromagnetic radiation ranging within a second spectral band. The second spectral band may be determined based on at least one of the first spectral band of first band-pass filter 122 and/or the specified spectral band of detector 116. In some embodiments, the second spectral band is set to coincide with a leaking gas spectral band in which the leaking gas does not emit or absorb electromagnetic radiation. For example, referring to methane as an example for the leaking gas, the second spectral band may be set to range between 3.3-3.7 μm (3.3-3.7 μm base to base, i.e. $\lambda_{min}$ to $\lambda_{max}$), in which the alkanes group of gases is transparent (e.g., does not emit or absorb electromagnetic radiation). In some embodiments, the specified spectral band of detector 116 includes the first spectral band of first band-pass filter 122 and the second spectral band of second band-pass filter 124. For example, referring to alkanes as an example for the leaking gas group of gases, the specified spectral band of detector 116 may be set in a range between 3-5 μm thereby including the first spectral band ranging between 3.2-3.5 μm and the second spectral band ranging between 3.3-3.7 μm.

Filters assembly 120 may comprise a third band-pass filter 128. Third band-pass filter 128 may be a cooled filter or it may be an uncooled filter (e.g., filter that is not subjected to any temperature stabilization means or subjected to temperature stabilization means). Third band-pass filter 128 may be arranged to transmit electromagnetic radiation ranging within a third spectral band. The third spectral band may be determined based on at least one of the first spectral band of first band-pass filter 122, may be determined based on at least one of the second spectral band of second band-pass filter 124 and/or the specified spectral band of detector 116. In some embodiments, the third spectral band is set to coincide with a leaking gas spectral band in which the leaking gas does not emit or absorb electromagnetic radiation. For example, referring to benzene as an example of the leaking gas, the third spectral band may be set to range between 3.1-3.4 μm (3.1-3.4 μm base to base, i.e. $\lambda_{min}$ to $\lambda_{max}$), in which the benzene group of gases is transparent (e.g., does not emit or absorb electromagnetic radiation). In some embodiments, the specified spectral band of detector 116 includes the first spectral band of first band-pass filter 122, the second spectral band of second band-pass filter 124 and the third spectral band of the third band-pass filter. For example, referring to alkanes as an example for the leaking gas group of gases, the specified spectral band of detector 116 may be set in a range between 3-7 μm thereby including the first spectral band ranging between 3.2-3.5 μm, the second spectral band ranging between 3.3-3.7 μm and the third spectral band ranging from 3.1-3.4 μm.

Filters assembly 120 may comprise further band-pass filters (not shown), up to n filters. These further band-pass filters may be cooled filters or they may be uncooled filters (e.g., filters that is not subjected to any temperature stabilization means or subjected to temperature stabilization means). These further band-pass filters may be arranged to transmit electromagnetic radiation ranging within n further spectral bands. These spectral band may be determined based on at least one of the first spectral band of first band-pass filter 122, may be determined based on the second spectral band of second band-pass filter 124, based on the third spectral band of third band-pass filter 128, or the spectral band of any of the n further filters, and/or the specified spectral band of detector 116. In some embodiments, the specified spectral band of detector 116 includes the first spectral band of first band-pass filter 122, the second spectral band of second band-pass filter 124, the third spectral band of the third band-pass filter and the nth spectral band of the nth band-pass filters.

In various embodiments, the first spectral band and/or the second spectral band and/or the nth spectral band may be set to be in a transparent atmosphere spectral band in which the atmosphere does not emit or absorb radiation. In various embodiments, the first spectral band and/or the second spectral band and/or the nth spectral band are further set such that detector 116 is capable of translating the detected photons into photoelectrons in such a way that it may be used to generate a real-time image.

Filters assembly 120 may comprise a filters-switching mechanism 126. Filters switching mechanism 126 may be arranged to interchange between first band-pass filter 122, second band-pass filter 124, third band-pass filter 128 and further n filters, to thereby position first band-pass filter 122 or second band-pass filter 124 or third band-pass filter 128 or nth band-pass filter, between detector 116 (or a dewar 112) and optics 114. In various embodiments, filters switching mechanism 126 comprises, for example, sliding (not shown) or pivoting mechanism (e.g., as shown in FIG. 1).

In various embodiments, first band-pass filter 122 and/or second band-pass filter 124 and/or third band-pass filter 128 and/or nth band-pass filters are changeable. e.g., may be replaced with other filters, based on, for example, the type of the leaking gas being detected and/or classified.

The electromagnetic radiation being transmitted by a filter (e.g., first band-pass filter 122, second band-pass filter 124, third band-pass filter 128 and n further filters) to a detector (e.g., detector 116) may be not in focus. The spatial contribution of the band-pass filters to the images being generated by the detector may have a Gaussian-like form and may comprise low spatial frequencies. Such spatial contribution of the filters may lead to, for example, non-uniformities in the generated images. System 100 may comprise a filtering unit 130 arranged to apply a digital two-dimensional high-pass filter to the images generated by detector 116 to thereby filter the spatial contribution of the filters (e.g., first band-pass filer 122, second band-pass filter 124, third band-pass filter 128, etc) in the images thereof.

In the simplest embodiment, detector 116 may be arranged to generate, using first band-pass filter 122, at least one first spectral band image of the specified field of view in the first spectral band. Detector 116 may be arranged to generate, using second spectral band-pass filter 124 (e.g., upon interchanging between first spectral band-pass filter 122 and second spectral band-pass filter 124. e.g., by filters switching mechanism 126), at least one second spectral band image of the specified field of view in the second spectral band.

In various embodiments detector 116 may be arranged to generate, using the third and/or further band-pass filters, at least a third and further spectral band images of the specified field of view of the third and further spectral bands.

In various embodiments, each of the at least one first spectral band image and/or of the at least one second spectral band image are one of stills image(s) or video image(s). In some embodiments, system 100 is a passive imaging system in which the at least one first spectral band image and the at least one second spectral band image are acquired without an external illumination. In some embodiments, system 100 may be an active imaging system in which the at least one first spectral band image and the at least one second spectral band image are acquired with an external illumination.

In embodiments, filters assembly 120 may comprise a third band-pass filter 128 and even a fourth and fifth band-pass filters (not shown). Filters assembly 120 may comprise a filter wheel mechanism enabling the use of multiple different interchangeable narrow band pass spectral filters. In various embodiments this may allow the classification of various gas compounds in a leaked gas plume. This classification may include retrieving the relative concentration of 2-3 gases or may also include verifying the presence or absence of a specific gas compound in a complex gas mixture. In various embodiments the use of a filter wheel assembly, which together with appropriate calibration data, calculation algorithms and processing power can be used to achieve classification of the composition of a gas plume such as retrieving the mean mass of the molecules in the mixture.

System 100 may comprise a non-uniformity correction (NUC) and bad pixels replacement (BPR) unit 135. In various embodiments, NUC-BPR unit 135 is arranged to perform NUC and BPR of the at least one first spectral band image and/or of the at least one second spectral band image and/or third and further spectral band images. NUC and BPR may be arranged to, for example, reduce noise in the at least one first spectral band image and/or in the at least one second spectral band image and/or the third and/or the further spectral band images, generated by detector 116.

According to some embodiments, system 100 comprises a classification unit 140. Classification unit 140 may be arranged to receive the at least one first spectral band image of the specified field of view and to receive the at least one second spectral band image of the specified field of view. In some embodiments, classification unit 140 is arranged to determine, based on the at least one first spectral band image and the at least one second spectral band image, a response of the leaking gas in the specified field of view (e.g., as described below with respect to FIG. 2). In some embodiments, classification unit 140 is arranged to determine, based on the at least one first spectral band image and the at least one second spectral band image, a classification of the leaking gas in the specified field of view (e.g., as described below with respect to FIG. 2).

Figure 2:
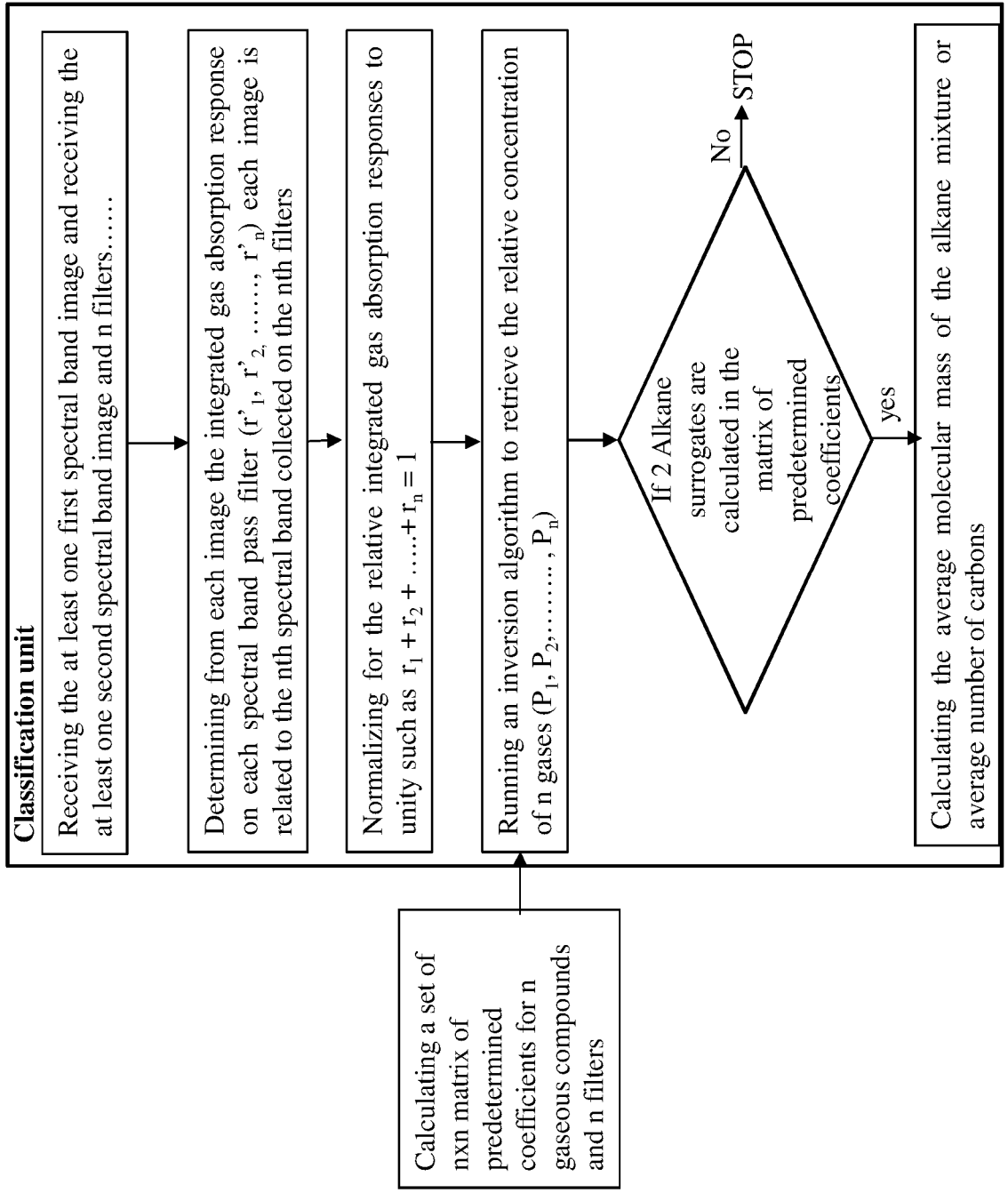
FIG. 2 is a flowchart of a method performed by a classification unit of a system for classifying a gas compound or a group of gas compounds in a gas leak, according to some embodiments of the invention.

Reference is now made to FIG. 2, which is a flowchart of a method performed by a classification unit, such as classification unit 140, of a system for classifying a gas compound or group of gas compounds in a gas leak and/or for an automatic detection of the gas leak, such as system 100, according to some embodiments of the invention.

Classification unit 140 may be arranged to receive the at least one first spectral band image of the specified field of view and to receive the at least one second spectral band image of the specified field of view. In various embodiments, classification unit 140 receives the at least one first spectral band image and/or the at least one second spectral band image after the NUC and BPR. e.g., performed by NUC-BPD unit 135 (e.g., as described above with respect to FIG. 1).

In some embodiments, the at least one first spectral band image comprises multiple temporally-sequential first spectral band images of the specified field of view and/or the at least one second spectral band image comprises multiple temporally-sequential second spectral band images of the specified field of view. Classification unit 140 may be further arranged to determine for each pixel of the at least one first spectral band image, a respective pixel's average value, based on respective pixels' values of the multiple temporally-sequential first spectral band images and/or to determine for each pixel of the at least one second spectral band image, a respective pixel's average value, based on respective pixels' values of the multiple temporally-sequential second spectral band images. The averaging thereof may be arranged to, for example, reduce a noise in the at least one first spectral band image and the at least one second spectral band image to thereby improve the signal to noise (SNR) ratio of the images thereof.

In some embodiments, classification unit 140 is arranged to perform registration of the at least one first spectral band image with respect to the at least one second spectral band image. In some embodiments, the registration is performed by correlating the at least one first spectral band image with respect to the at least one second spectral band image. The registration thereof may be arranged to correct offsets of the at least one first spectral band image with respect to the at least one second spectral band image. The offsets may be due to, for example, system 100 displacements and/or differences between first band-pass filter 122 and second band-pass filter 124 (e.g., due to filters' non-uniformities and/or misalignment between the filters thereof).

Embodiment 1: Alkane Mixture and Pure Benzene Determination

In many instances, there is prior knowledge of the leaked gas plume's composition. Most detected plume's in the petrochemical industry environment are a complex mixture of volatile organic compounds (VOCs), primarily alkanes. Embodiments of the present invention allows for an estimation and calculation of the molecular mass of the plume when alkanes are the dominant compound. Certain embodiments of the present invention may estimate and/or calculate the average number of carbons in the mixture (between 1 and 8).

Figure 3:
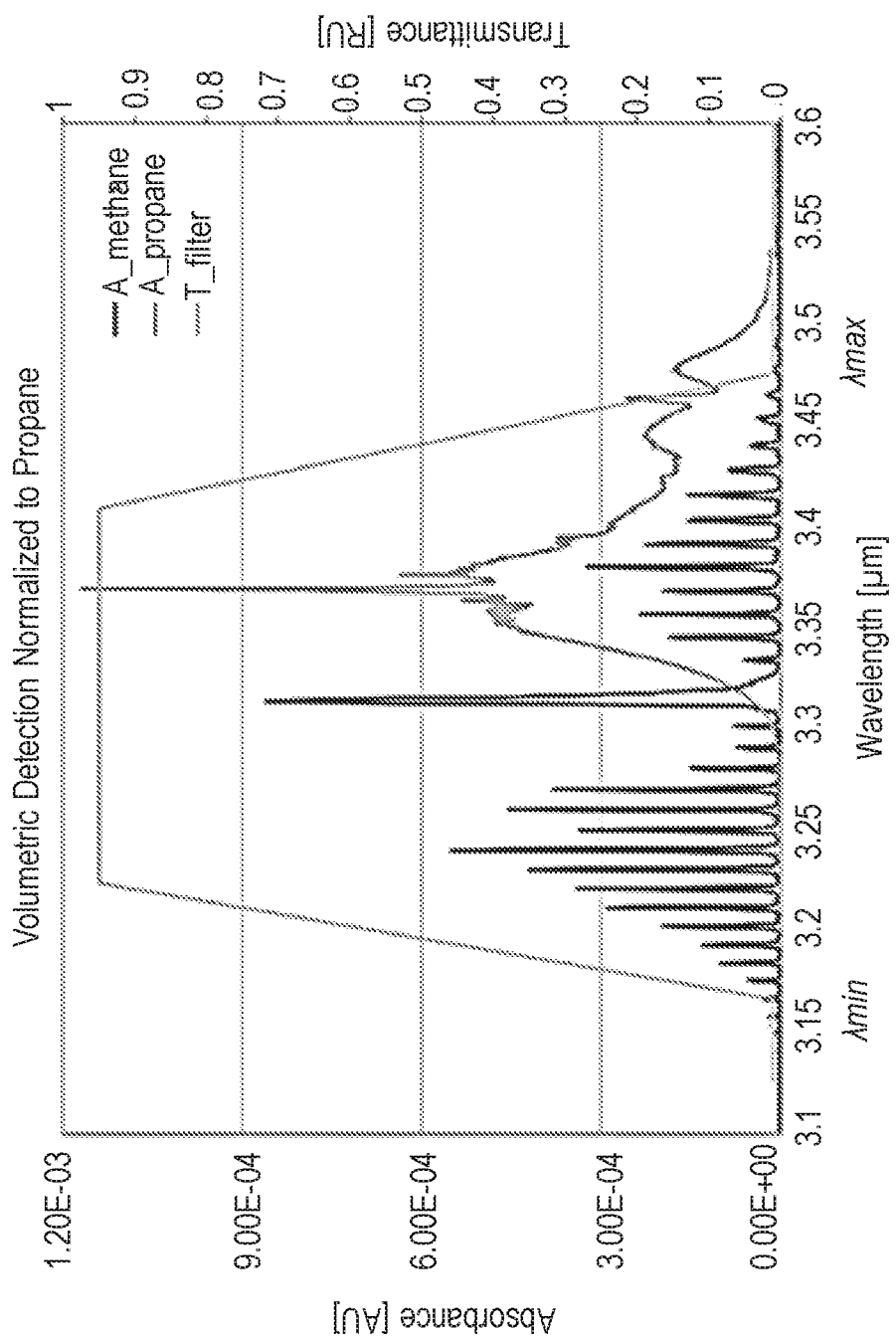
FIG. 3 is an EyeCgas standard filter transmittance graph along with the absorbance spectra of methane and propane, according to some embodiments of the invention.

In the graph in FIG. 3, the absorbance spectra of methane and propane is shown. The graph is an EyeCgas standard filter transmission along with the absorbance spectra of methane and propane collected at 1 ppm m (parts per million meter) (at 1 atm and a temperature of 25° C. The filters clearly separate the two compounds, methane showing on the first filter and the propane showing on the second filter. In an embodiment the volumetric detection is normalized to propane, in other embodiments the volumetric detection may be normalized to other gases, for example, methane, ethane, etc.

Figure 4:
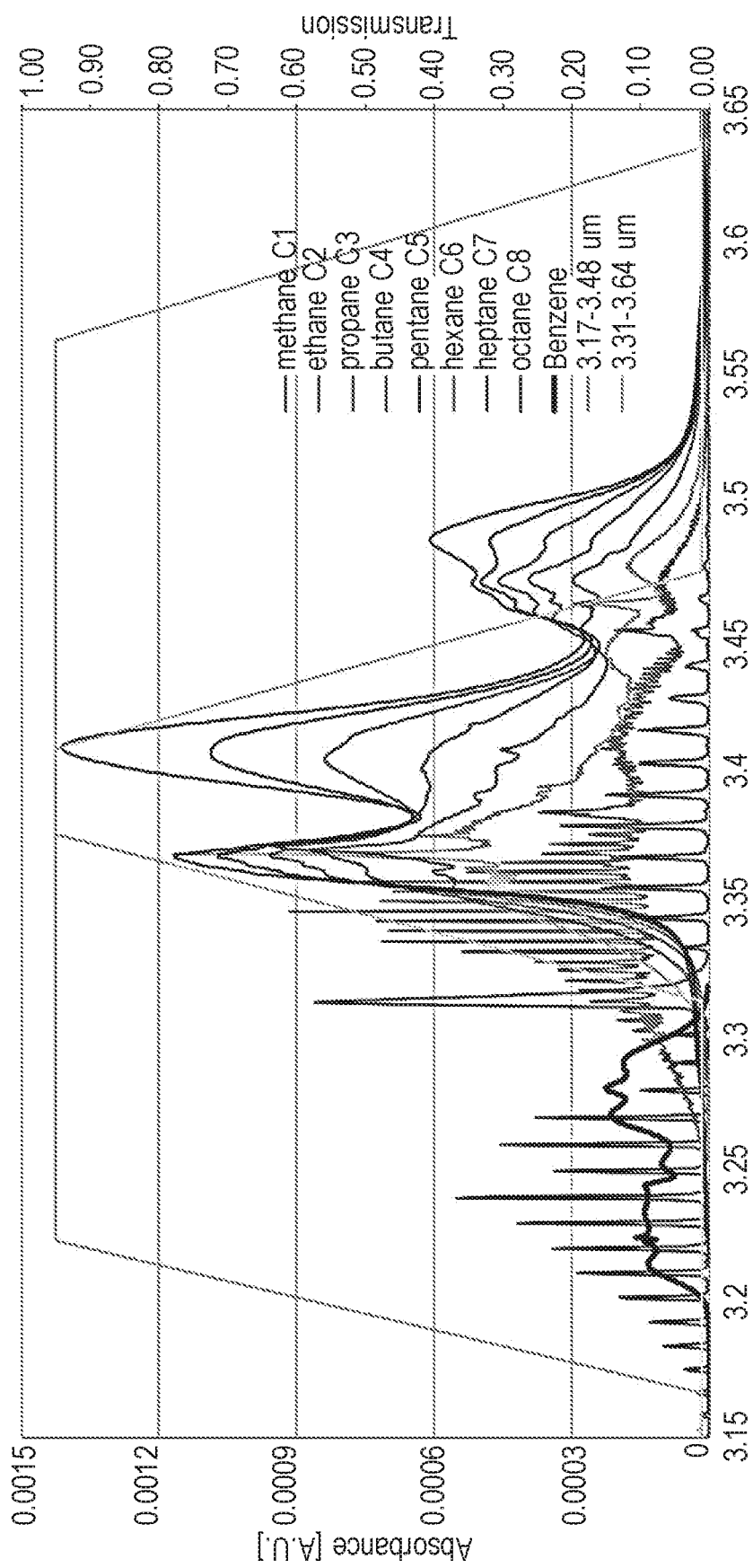
FIG. 4 is a graph illustrating the absorbance response for the eight straight chain alkanes from 1 carbon, methane, to 8 carbons, octane, according to some embodiments of the invention.

In the graph in FIG. 4, the absorption response in base 10 absorbance units (AU) is given for the eight straight chain alkanes from 1 carbon methane to 8 carbons octane: Methane (1 Carbon, 16 g/mol), ethane (2 Carbons, 30 g/mol), propane (3 Carbons, 44 g/mol), butane (4 Carbons, 58 g/mol), pentane (5 Carbons, 72 g/mol), hexane (6 Carbons, 86 g/mol), and octane (8 Carbons, 114 g/mol). In addition, benzene absorption response is also shown. All of them were measured at 1 ppm m concentration at standard room temperature and pressure conditions (25° C. and 1 atmosphere).

Filter 1 has a band pass of 3.2 μm-3.5 μm (3.2-3.5 base to base).

Filter 2 has a band pass of 3.3 μm-3.7 μm (3.3-3.7 base to base).

The relative response of the gases in each of the two filters can be calculated using the area under the gas absorbance curve weighted by the transmission at wavelength in the area integration process. As can be seen from the absorption graphs in FIG. 4, all alkanes can be detected with both filters, but benzene can be detected only on the first filter (heavy dark curve).

The volumetric absorption relative to methane (VARM) is calculated for each compound by ratio given in Equation 1:

$$VARM_{compound} = \frac{\int_{\lambda_{min}}^{\lambda_{max}} A_{compound}(\lambda) \cdot T_{filter}(n, \lambda) d\lambda}{\int_{\lambda_{min}}^{\lambda_{max}} A_{methane}(\lambda) \cdot T_{filter}(1, \lambda) d\lambda} \quad (1)$$

where $A_{compound}(\lambda)$—Absorbance value at each wavelength for the relevant compound.

$A_{methane}(\lambda)$—Absorbance value at each wavelength for methane.

$T_{filter}(n,\lambda)$—Transmittance value at each wavelength for the camera's nth filter.

$\lambda_{min}$ and $\lambda_{max}$—The short and long edge wavelengths of the camera's filter, respectively, i.e. base to base.

Figure 5:
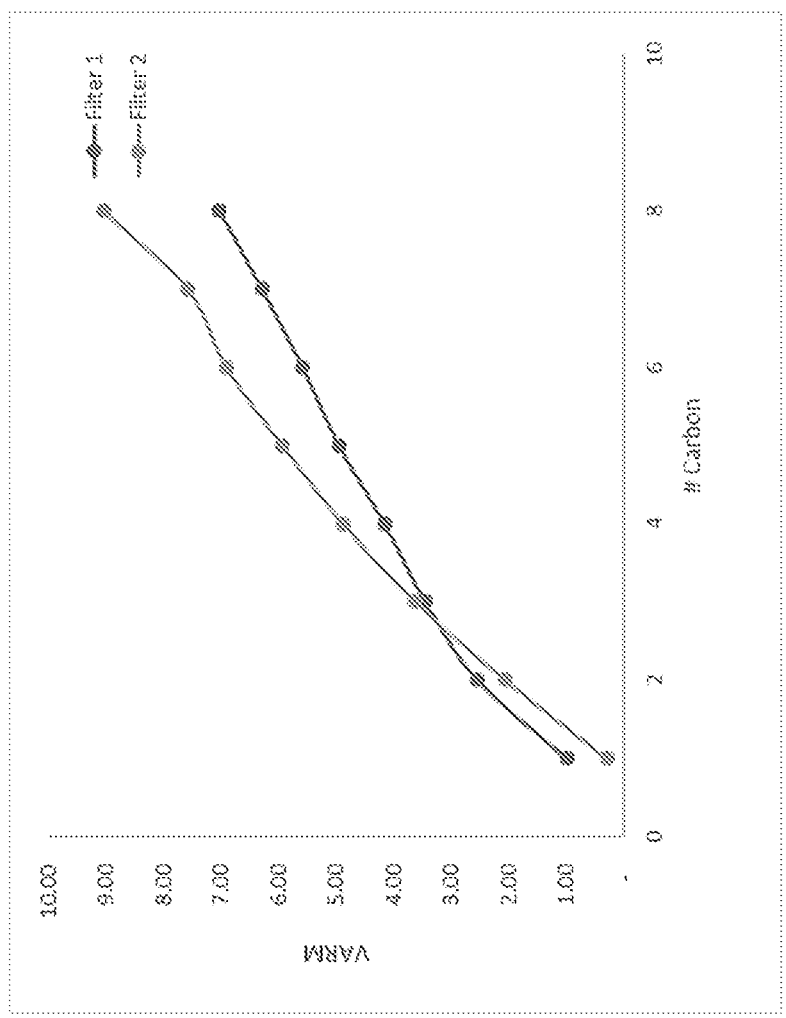
FIG. 5 is a graph illustrating the relative response of all alkanes for both filters, according to some embodiments of the invention.

FIG. 5 shows the VARM plotted against the number of carbons. Where the curves meet the ratio of the filters relative to each other is 1.

For the alkanes, the absorption response (area under the curve) increases monotonically with the size of the molecule in both filters but at a much slower rate in Filter1. This is shown in FIG. 4. Additionally, the area's center of mass shifts to the longer wavelength.

The relative response (calculated area normalized to methane (or any other gas) in the standard filter) of all alkanes for both filters is given the table below:

| NAME | Molecular Mass [g/mole] | # of Carbons | Relative Area Filter 1 | Relative Area Filter 2 |
|---|---|---|---|---|
| Methane | 16 | 1 | 1.00 | 0.30 |
| Ethane | 30 | 2 | 2.55 | 2.06 |
| Propane | 44 | 3 | 3.46 | 3.63 |
| Butane | 58 | 4 | 4.17 | 4.88 |
| Pentane | 72 | 5 | 4.96 | 5.94 |
| Hexane | 86 | 6 | 5.59 | 6.91 |
| Heptane | 100 | 7 | 6.30 | 7.59 |
| Octane | 114 | 8 | 7.04 | 9.05 |
| Benzene | 78 | 6 | 1.17 | 0.00 |

The benzene curve is the only gas compound that has a response only detected on the first filter, Filter 122, heavy lined curve towards the left of the graph.

The relative response information in each filter provides sufficient information for calculating the average number of carbons, assuming the camera observes a plume of alkane mixture (which is very typical for petrochemical industry). In some embodiments, a possible approach for calculating the average number of carbons is to consider the extreme pure relative responses (1 and 8 carbons, methane and octane respectively) on both filters, and compare it to the observed relative response on both filters.

If a leak is detected on both filters, the relative response is calculated for both filters and normalized to the sum of the relative responses. This normalization provides the constrained responses on both filters ($r_1$, $r_2$) such as $r_1+r_2=1$. The above model, which assumes (as surrogates) an alkane mixture plume comprised of only two alkane compounds (e.g. methane and octane) can be formulated as follows:

$$\begin{pmatrix} k_{m1} & k_{o1} \\ k_{m2} & k_{o2} \end{pmatrix} \begin{pmatrix} P_m \\ P_o \end{pmatrix} = a \begin{pmatrix} r_1 \\ r_2 \end{pmatrix}$$

Where each element in the kernel matrix K is the relative response (normalized to an arbitrary element in the matrix) of a surrogate compound on a filter (2×2 dimension; 2 compounds, 2 filters). The lines or rows in the kernel matrix represent the two filters (the number indices), and the columns represent the two edge surrogate alkane compounds (the indices m and o are for methane and octane in this embodiment, in other embodiments the gases may be different, for example, ethane, propane).

The underlying assumed proportioned concentrations of the surrogate alkane compounds in the detected plume, are given in this embodiment as $P_m$ and $P_o$ for methane and octane respectively, such as $P_m+P_o=1$. The coefficient a is a normalizing coefficient for constraining the sum of the components in vector r to unity.

This model can be solved for the proportional concentrations of the two extreme components, and an estimate and/or calculation of the average number of carbons $\overline{NC}$ may be calculated (for this embodiment) as:

$$\overline{NC} = P_m \cdot 1_{carbons} + P_o \cdot 8_{carbons}$$

In embodiments, if a plume is not detected in Filter 2 one may conclude that the plume is most likely comprised from pure Benzene.

Embodiment 2: Benzene Relative Concentration in a Mixture

Figure 6:
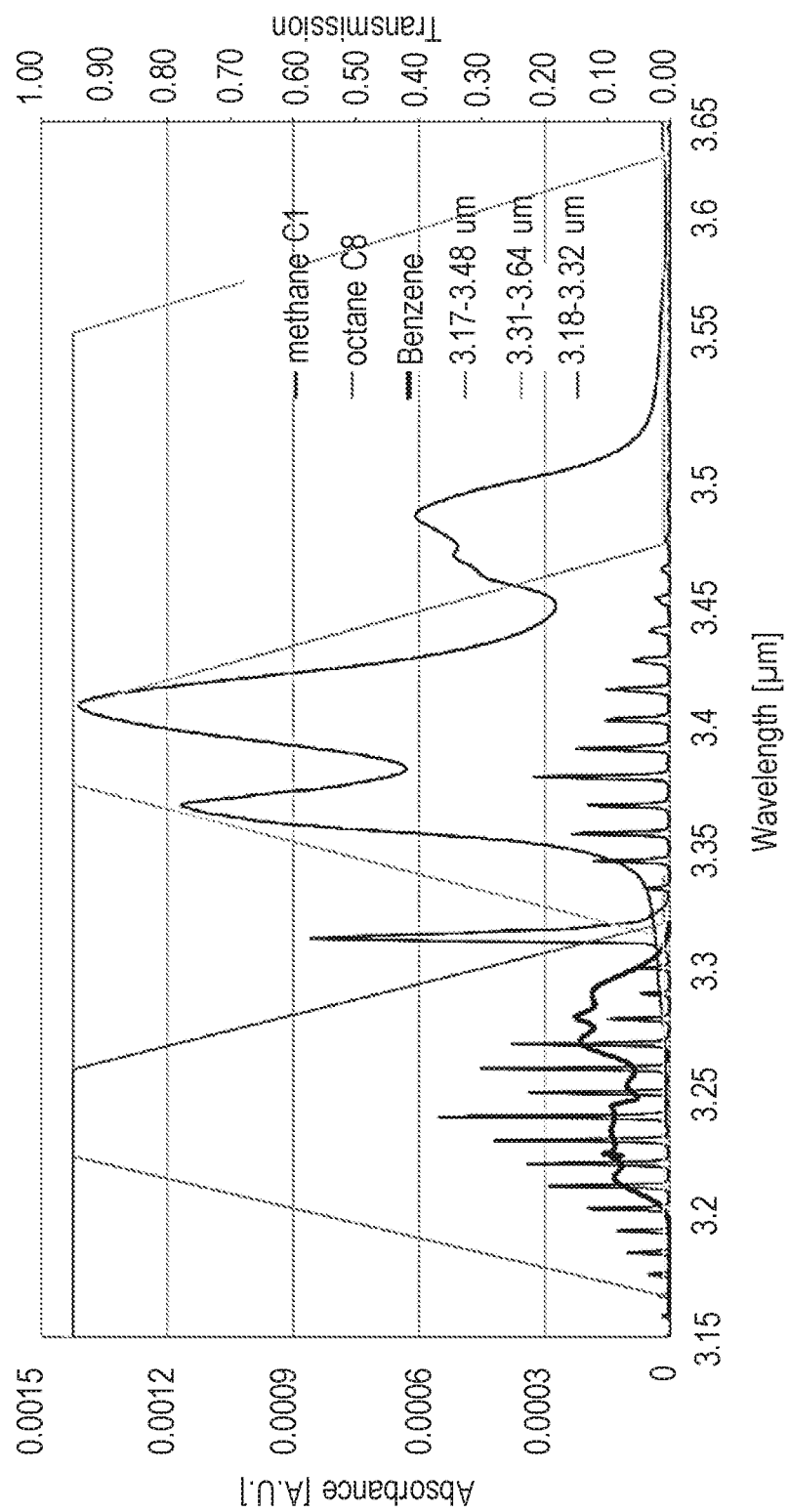
FIG. 6 is a graph showing the use of a third filter to classify benzene, according to some embodiments of the invention.
Figure 7:
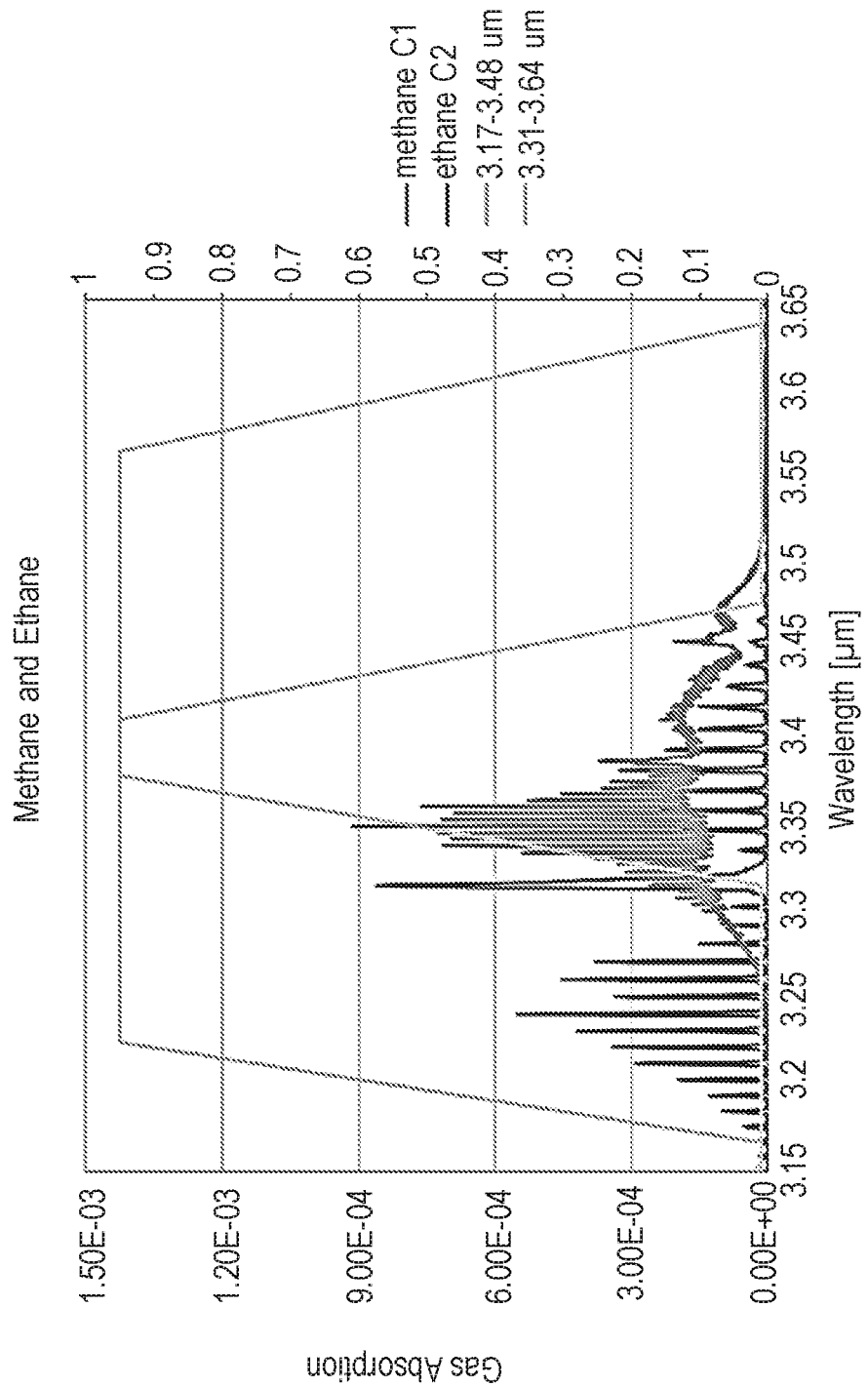
FIG. 7 is a graph showing the absorbance response of two adjacent alkanes on the two filters according to some embodiments of the invention.
Figure 8:
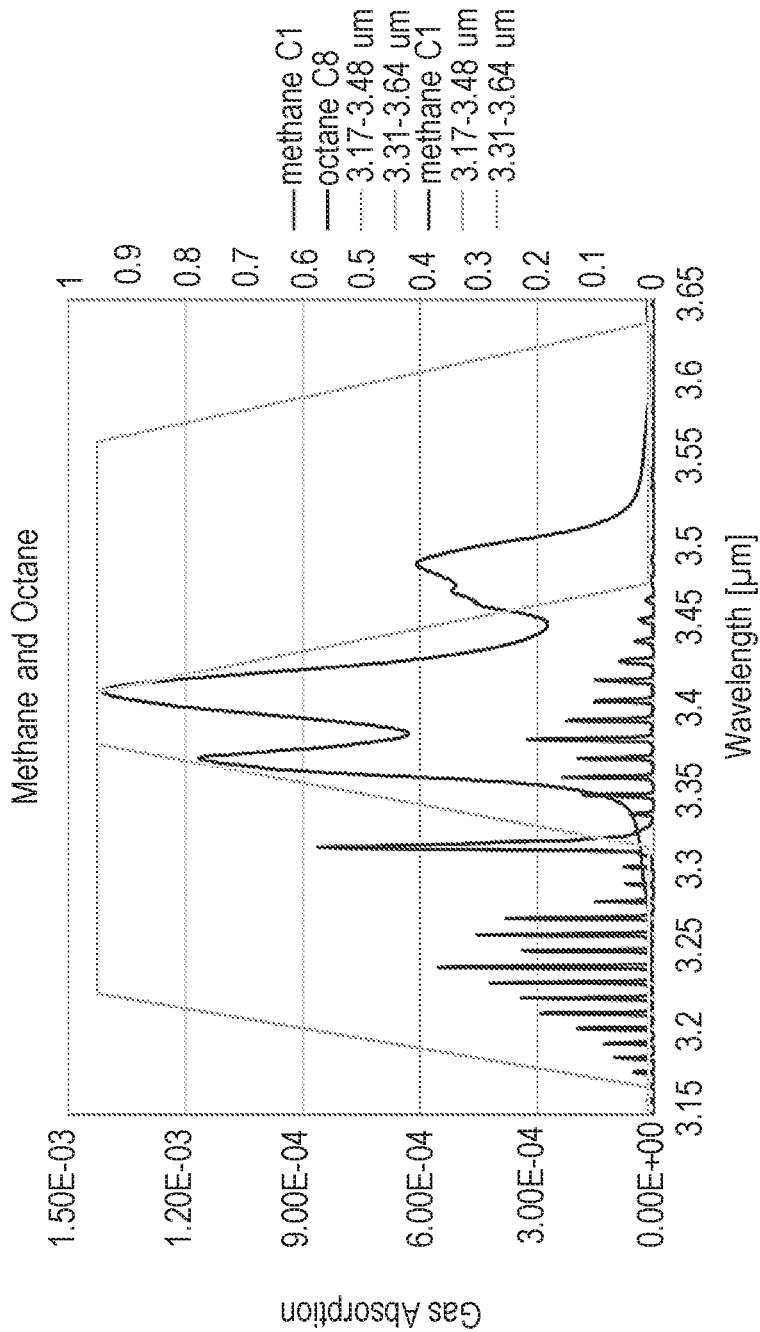
FIG. 8 is a graph showing the absorbance response of two alkanes, methane and octane, on the two filters, according to some embodiments of the invention.
Figure 9:
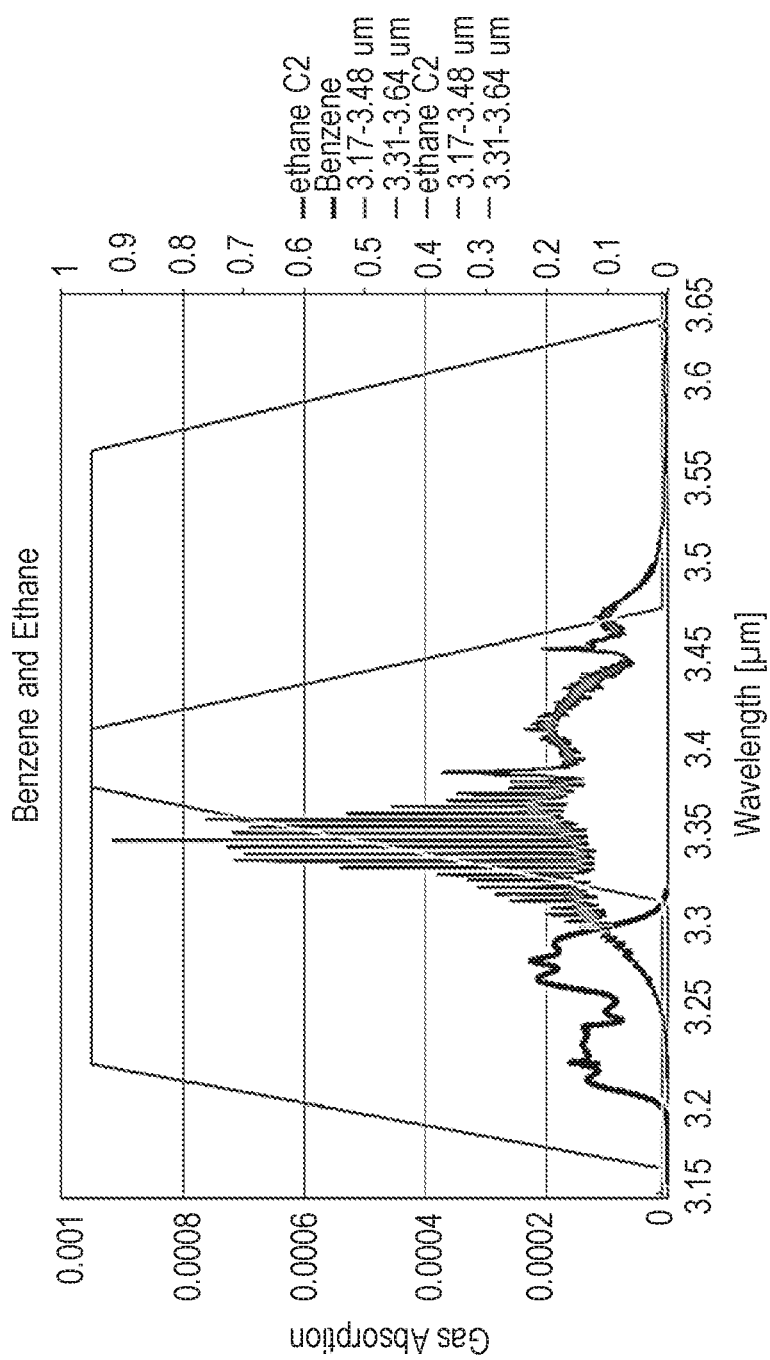
FIG. 9 is a graph showing the absorbance response, on two filters, to separate benzene from the alkanes, according to some embodiments of the invention.
Figure 10:
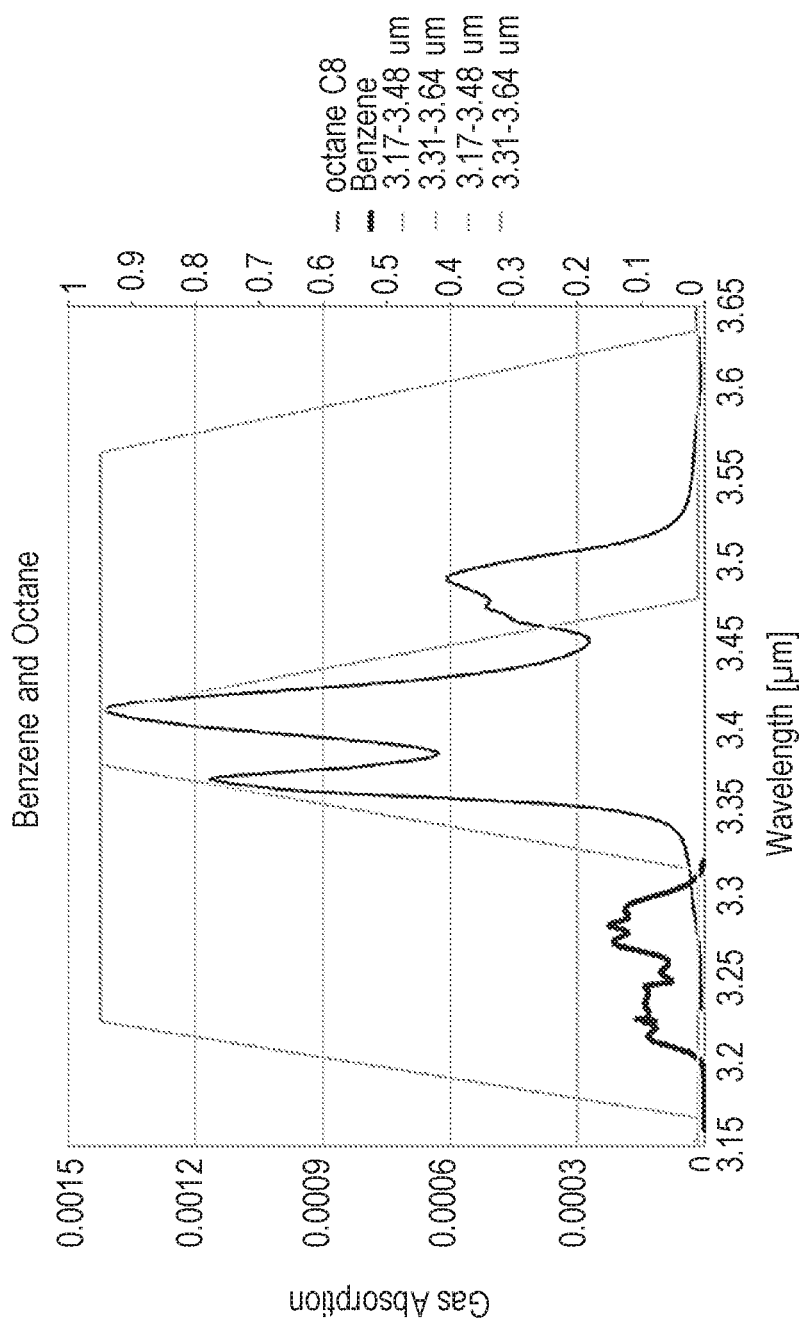
FIG. 10 is a graph showing the absorbance response, on two filters to separate benzene from the alkanes, according to some embodiments of the invention.

Certain embodiments of the present invention may also be capable of specifying the relative make (e.g. 30% benzene and 70% of alkane mixture of $\overline{NC} \approx 3.5$) for a mixture of benzene and alkanes by adding a third filter with a wavelength of between 3.0 μm-3.3 μm base to base, as shown in FIG. 6.

There are 3 measurements (vectors r in 3 filters) which are used to formulate 3 equations to solve for the 3 unknowns (vector P two alkane mixture surrogates and benzene as follows:

$$\begin{pmatrix} k_{m1} & k_{o1} & k_{b1} \\ k_{m2} & k_{o2} & k_{b2} \\ k_{m3} & k_{o3} & k_{b3} \end{pmatrix} \begin{pmatrix} P_m \\ P_o \\ P_b \end{pmatrix} = a \begin{pmatrix} r_1 \\ r_2 \\ r_3 \end{pmatrix}$$

As above for the 2-filter embodiment, each element in the kernel matrix K is the relative response (normalized to an arbitrary element in the matrix) of a gas compound on a filter (3×3 dimension; 3 compounds, 3 filters). The lines or rows in the kernel matrix represent the three filters (the number indices), and the columns represent the three compounds, two edge surrogate alkanes and benzene. Again, the indices m, o, and b are for methane, octane and benzene in this embodiment. In other embodiments other gas compounds may be selected. The underlying assumed proportioned concentrations of the gas compounds in the detected plume of leaked gas, are given in this example as $P_m$, $P_o$ and $P_b$ for methane, octane, and Benzene respectively, such as $P_m+P_o+P_b=1$. The coefficient a is a normalizing coefficient for constraining the sum of the components in vector r to unity.

The result of the algorithm of an embodiment, provides the volumetric fraction of Benzene in the leaked plume of gas and the volumetric fraction for the alkanes mixture with an estimated average number of carbons in the alkane mixture may be calculated as:

$$\overline{NC} = P'_m \cdot 1_{carbons} + P'_o \cdot 8_{carbons}$$

Wherein the sum of $P_m$ and $P_o$ is normalized to unity to provide $P'_m$ and $P'_o$ for the $\overline{NC}$ calculation.

Embodiment 3: Relative Concentration of Simple Mixtures

In some cases, there is prior knowledge of only several compounds in the detected leaked plume that are also absorbed in the same spectral region. In such embodiments, 2 or more filters (at least 2 filters for 2 compounds, etc.) may be designed for the filter wheel to apportion the relative concentrations of the gas compounds in the plume.

In an embodiment, the mathematical formulation is like the surrogate compound relative concentration analysis described above but for the actual gas compounds. In an embodiment of such cases is stack or flare emissions containing sulfur dioxide relative to carbon dioxide and carbon monoxide emissions.

Using a combination of two different filters, which, in some embodiments, may have some overlapping spectral transmission regions, embodiments of the present invention may apportion the relative concentration of two gases, which may have some overlapping absorption spectral regions. The graphs in FIGS. 7 to 10 show four examples of absorption spectrum for 2 different gasses along with the spectral transmission of 2 different filters. Assuming prior knowledge that the leaked gas plume is comprised primarily of 2 gas compounds, the relative response data for 2 filters may be sufficient for calculating the relative concentration (in %) of the two compounds.

Using a combination of three different filters, which, in some embodiments, may have some overlapping spectral transmission regions, embodiments of the present invention may apportion the relative concentration of three gas compounds or three groups of gas compounds, which may have some overlapping absorption spectral regions. In this case three spectrum for 3 different gas compounds along with the spectral transmission of 3 different filters can be ascertained. Assuming prior knowledge that the leaked gas plume is comprised primarily of 3 gas compounds, the relative response data for 3 filters may be sufficient for calculating the relative concentration (in %) of the three gas compounds.

Using a combination of n different filters, which, in some embodiments, may have some overlapping spectral transmission regions, embodiments of the present invention may apportion the relative concentration of n gases, which may have some overlapping absorption spectral regions. This would result in obtaining the absorption spectrum for n different gasses along with the spectral transmission of n different filters. Assuming prior knowledge that the leaked gas plume is comprised primarily of n gas compounds, the relative response data for n filters may be sufficient for calculating the relative concentration (in %) of the n gas compounds and/or classifying individual gas compounds or group of gas compounds from the plurality of leaking gases.

Aspects of the present invention are described above with reference to flowchart illustrations and/or portion diagrams of methods and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for classifying at least one individual gas compound from a plurality of leaked gases in a specified field of view, the method comprising:

generating, by a cryogenically cooled detector and using a first of at least n filters, a first spectral band image of the specified view in a first spectral band coinciding with said leaking gases spectral bands in which said leaking gases emit and absorb electromagnetic radiation;

generating, by said cryogenically cooled detector and using a second of said at least n filters, a second spectral band image of the specified view in a second spectral band coinciding with said leaking gases spectral band in which said leaking gases emit and absorb electromagnetic radiation;

calculating from the first and second images, the relative absorption response of said gases in each of said first and second filters, respectively;

calculating a set of predetermined coefficients, wherein a first coefficient is the integrated spectral absorption response of a first gas and transmission of said first filter, relative to a predetermined known concentration of a known gas; a second coefficient is the integrated spectral absorption response of a second gas and transmission of said first filter, relative to said predetermined known concentration of a known gas; a third coefficient is the spectral absorption response of a first gas and said transmission of said second filter, relative to said predetermined known concentration of a known gas; and a fourth coefficient is the spectral absorption response of a second gas on and said transmission of said second filter, relative to said predetermined known concentration of a known gas;

normalizing said relative absorption responses to the sum of relative responses of said first and second filters respectively; and calculating the weighted average molecular mass of said gas compound of said leaking gases by determining the pure relative responses on said first and second filters and comparing each response to the observed relative response on said first and second filters.

2. The method of claim 1, wherein calculating the relative response of said gas compound comprises calculating the volumetric absorption of said gas compound or said group of said compounds relative to at least one of: methane, ethane or propane.

3. The method of claim 1, wherein calculating the relative response of said group of gas compounds comprises calculating the volumetric absorption of said group of gas compounds relative to at least one of: methane, ethane or propane.

4. A method for classifying at least a group of gas compounds from a plurality of leaked gases in a specified field of view, the method comprising:

generating, by a cryogenically cooled detector and using a first of at least n filters, a first spectral band image of the specified view in a first spectral band coinciding with said leaking gases spectral bands in which said leaking gases emit and absorb electromagnetic radiation;

generating, by said cryogenically cooled detector and using a second of said at least n filters, a second spectral band image of the specified view in a second spectral band coinciding with said leaking gases spectral band in which said leaking gases emit and absorb electromagnetic radiation;

calculating from the first and second images, the relative absorption response of said gases in each of said first and second filters, respectively;

calculating a set of predetermined coefficients, wherein a first coefficient is the integrated spectral absorption response of a first gas and transmission of said first filter, relative to a predetermined known concentration of a known gas; a second coefficient is the integrated spectral absorption response of a second gas and transmission of said first filter, relative to said predetermined known concentration of a known gas; a third coefficient is the spectral absorption response of a first gas and said transmission of said second filter, relative to said predetermined known concentration of a known gas; and a fourth coefficient is the spectral absorption response of a second gas on and said transmission of said second filter, relative to said predetermined known concentration of a known gas;

normalizing said relative absorption responses to the sum of relative responses of said first and second filters respectively; and calculating the weighted average molecular mass of said gas or group of gases of said leaking gases by determining the pure relative responses on said first and second filters and comparing each response to the observed relative response on said first and second filters.

5. A method for classifying at least one individual gas compound and a group of gas compounds from a plurality of leaked gases in a specified field of view, the method comprising:

generating, by a cryogenically cooled detector and using a first of at least n filters, a first spectral band image of the specified view in a first spectral band coinciding with said leaking gases spectral bands in which said leaking gases emit and absorb electromagnetic radiation;

generating, by said cryogenically cooled detector and using a second of said at least n filters, a second spectral band image of the specified view in a second spectral band coinciding with said leaking gases spectral band in which said leaking gases emit and absorb electromagnetic radiation;

generating, by said cryogenically cooled detector and using a third of said at least n filters, a third spectral band image of the specified view in a third spectral band coinciding with said leaking gases spectral band in which said leaking gases emit and absorb electromagnetic radiation;

calculating from the first, second and third images the relative absorption response of said individual gas compound and said group of gas compounds in each of said first, second and third filters, respectively;

calculating a set of predetermined coefficients, wherein a first coefficient is the integrated spectral absorption response of a first gas compound and transmission of said first filter, relative to a predetermined known concentration of a known gas; a second coefficient is the integrated spectral absorption response of a second gas compound and transmission of said first filter, relative to said predetermined known concentration of a known gas; a third coefficient is the spectral absorption response of a third gas compound and said transmission of said first filter, relative to said predetermined known concentration of a known gas; and a fourth coefficient is the spectral absorption response of a first gas compound on and said transmission of said second filter, relative to said predetermined known concentration of a known gas, wherein a fifth coefficient is the integrated spectral absorption response of said second gas compound and transmission of said second filter, relative to a predetermined known concentration of a known gas; a sixth coefficient is the integrated spectral absorption response of said third gas compound and transmission of said second filter, relative to said predetermined known concentration of a known gas; a seventh coefficient is the spectral absorption response of said first gas compound and said transmission of said third filter, relative to said predetermined known concentration of a known gas; an eighth coefficient is the spectral absorption response of said second gas compound on and said transmission of said third filter, relative to said predetermined known concentration of a known gas, a ninth coefficient is the spectral absorption response of said third gas compound on said transmission on said third filter, relative to said predetermined known concentration of a known gas;

normalizing said relative absorption responses to the sum of relative responses of said first, second and third filters respectively; and calculating the weighted average molecular mass of said gas compound and group of gas compounds of said leaking gases by determining the pure relative responses on said first, second and third filters and comparing each response to the observed relative response on said first, second and third filters.

6. The method of claim 5, wherein calculating the relative response of said gas compound and group of said gas compounds comprises calculating the volumetric absorption of said gas compound or said group of said compounds relative to at least one of: methane, ethane or propane.

7. The method of claim 5, wherein said individual gas compound and said group of gas compounds comprise benzene and two edge surrogate alkanes, respectively.

* * * * *